Patented Nov. 8, 1927.

1,648,540

UNITED STATES PATENT OFFICE.

HANS T. CLARKE AND CARL J. MALM, OF ROCHESTER, NEW YORK, ASSIGNORS TO EASTMAN KODAK COMPANY, OF ROCHESTER, NEW YORK, A CORPORATION OF NEW YORK.

PROCESS OF PREPARING HALOGEN SUBSTITUTED ANHYDRIDES OF THE FATTY ACIDS.

No Drawing. Application filed December 10, 1926. Serial No. 154,025.

This invention relates to the preparation of halogen substituted anhydrides of the fatty acids. One object of the invention is to provide a simple and easily controlled process. Other objects will hereinafter appear.

We have found that the halogen substituted anhydrides of the fatty acids may be prepared by distilling together the corresponding halogen substituted fatty acid with sufficient acetic anhydride, employing a distillation system which allows the acetic acid, formed in the reaction, to be separated from the residue and yet retains the halogen substituted anhydride of the fatty acid. In the preferred form of our invention we use 2 molecular proportions by weight of the halogen substituted fatty acid and 1 molecular proportion of acetic anhydride.

We shall now give examples of our invention by way of illustration, but it will be understood that our invention is not limited to the details thus given except as indicated in the appended claims. For the preparation of chloracetic anhydride 1890 parts by weight of chloracetic acid and 1075 parts of 95% acetic anhydride are heated together under a distilling column, of the usual type, in such a manner that the temperature of the escaping vapors does not exceed 119° C. This permits the vapors of the acetic acid, formed by the reaction, to be conducted away and condensed or otherwise recovered. But the chloracetic anhydride, which is formed, remains in the reaction mixture. When the condition of the reacting system cannot be maintained in such a way that the escaping vapors do not exceed 119° C., the reaction is substantially complete and the residue is fractionally distilled under reduced pressure. For example, we have found it convenient to distill at 15 mm. of mercury pressure and find that the chloracetic anhydride is chiefly in the fraction boiling at 115° to 120° C. at such reduced pressure. In other words, the reaction may be carried out conveniently at atmospheric pressure, but the distillation is performed at subatmospheric pressure. The yield is about eighty per cent of the theoretical one.

In this example, in place of the chloracetic acid, we may substitute di or trichlor acetic acid, mono di or tribrom acetic acid, or mono di or trichlor or brom substitution products of higher fatty acids from propionic and butyric through to lauric, palmitic and stearic. Of course, mixtures of such halogenated acids can be likewise treated. With the increasing molecular weights of the halogenated acids, it is desirable that the temperatures be kept low enough to avoid decomposition or injury of the product.

Having thus described our invention, what we claim as new and desire to secure by Letters Patent is:

1. The process of preparing a halogen substituted anhydride of a fatty acid which comprises heating together the corresponding halogen substituted fatty acid with acetic anhydride, separating the acetic acid, formed in the reaction, and recovering the halogen substituted anhydride from the residue.

2. The process of preparing a halogen substituted anhydride of a fatty acid which comprises distilling together substantially 2 molecular proportions by weight of said halogen substituted acid with 1 molecular proportion of acetic anhydride, distilling off the acetic acid, formed by the reaction, and distilling off the halogen substituted anhydride of the fatty acid under subatmospheric pressure.

3. The process of preparing chloracetic anhydride which comprises heating together chloracetic acid and acetic anhydride, removing the acetic acid formed in the reaction, and distilling off and recovering the chloracetic anhydride.

4. The process of preparing chloracetic anhydride which comprises distilling together substantially 2 molecular proportions of chloracetic acid and 1 molecular proportion of acetic anhydride, distilling off the acetic acid, formed in the reaction, and distilling off and collecting the chloracetic anhydride, at 115 to 120° C. under a subatmospheric pressure of the order of magnitude of 15 mm. of mercury.

Signed at Rochester, New York, this 6th day of December, 1926.

HANS T. CLARKE.
CARL J. MALM.